United States Patent [19]

Burpulis et al.

[11] 3,865,354
[45] Feb. 11, 1975

[54] APPARATUS

[75] Inventors: John Samuel Burpulis; Robert David Souffie, both of Wilmington, Del.; John D. Counceller, Mt. Gillad; Robert De Capite, Worthington Hills, both of Ohio

[73] Assignee: E. I. du Pont de Nemours and Company, Wilmington, Del.

[22] Filed: Sept. 17, 1973

(Under Rule 47)

[21] Appl. No.: 397,721

Related U.S. Application Data

[63] Continuation of Ser. No. 235,491, March 17, 1972, abandoned.

[52] U.S. Cl. ............................... 259/191, 425/145
[51] Int. Cl. ............................................. A21c 1/106
[58] Field of Search ........... 259/191, 192, 193, 5, 9, 259/10, 21, 22, 25, 26, 45, 46; 264/328, 329; 425/145, 326, 142

[56] References Cited
UNITED STATES PATENTS

| | | | |
|---|---|---|---|
| 2,947,030 | 8/1960 | Varn | 259/191 |
| 3,111,707 | 11/1963 | Buckley | 425/145 |
| 3,140,332 | 7/1964 | Brown | 264/329 |
| 3,317,962 | 5/1967 | Morse | 259/191 |
| 3,371,386 | 3/1968 | Ludwig | 259/191 |
| 3,436,443 | 4/1969 | Hutchinson | 425/326 |
| 3,697,204 | 10/1972 | Kyritsis | 425/4 |
| 3,728,056 | 4/1973 | Theysohn | 425/142 |

Primary Examiner—Robert W. Jenkins

[57] ABSTRACT

A close control of throughput in a reciprocating screw injection molding machine for elastomeric materials is obtained by a positive acting feed means located above the machine inlet and a choke-device mounted in the inlet to prevent balling of the material.

7 Claims, 2 Drawing Figures

3,865,354

APPARATUS

This is a continuation, of application Ser. No. 235,491, filed Mar. 17, 1972, now abandoned.

BACKGROUND OF THE INVENTION

This invention relates to injection molding of elastomeric material with a reciprocating screw machine and more particularly it relates to regulating the supply of material to the screw to provide a close control of through-put in each injection cycle.

Reciprocating screw injection molding units are known for use with both rubber and plastic materials. Although such equipment works satisfactorily for both materials, it has been found that there is a tendency for partly masticated elastomeric material to form a ball in the feed inlet to the screw machine undesirably reducing throughput.

When carrying out injection molding with reciprocating screw extruders, it has been found that in the production of large, heavy elastomeric objects of relatively thick cross sections such as automobile bumpers, changes in throughput cannot be tolerated. Furthermore, there is a definite need for synchronization of a positive feed with operation of the screw for commercial production of molded parts of high uniform quality. The present invention overcomes this problem and fulfills this need successfully.

SUMMARY OF THE INVENTION

The present invention involves an apparatus for molding elastomeric material with a reciprocating screw injection molding machine that includes a reciprocable, rotatable screw and an elongated housing surrounding the screw, the housing having an outlet adjacent one end and an inlet adjacent the other end of the screw. A drive means is provided for rotating the screw at variable speed and a mold is attached to the housing with passages connecting the housing outlet and the mold cavity. The elastomeric material is fed in the form of a flat strand material into the inlet according to the demand of the screw, then masticated and heated in the housing and fed by action of the screw to the front of the housing where the material accumulates forcing the screw toward the rear of the housing against a back pressure. Next, the screw reciprocates forward injecting the material through the connecting passages into the mold. The improvement comprises arranging the inlet feed passage transverse to the longitudinal axis of the screw housing and smoothly fairing the inlet passage into the normal cross section of the housing in the direction of screw rotation. The passage is provided with a material deflecting member extending into the inlet passage along the upstream wall and substantially the entire length thereof and less than the width thereof. The material is fed into the inlet in a vertical path at a fixed velocity by a strip feeder that includes a roll driven by a motor located directly above the inlet. The strand material has sufficient stiffness to lift itself from the feed roll when the demand of the screw is less than the feed velocity and to lower itself to a fully engaged position with the roll's surface when the demand catches up with the feed velocity. The drive roll motor is coupled to a control means which actuates the motor in response to screw rotation.

DETAILED DESCRIPTION OF THE ILLUSTRATED EMBODIMENT

Figure 1:
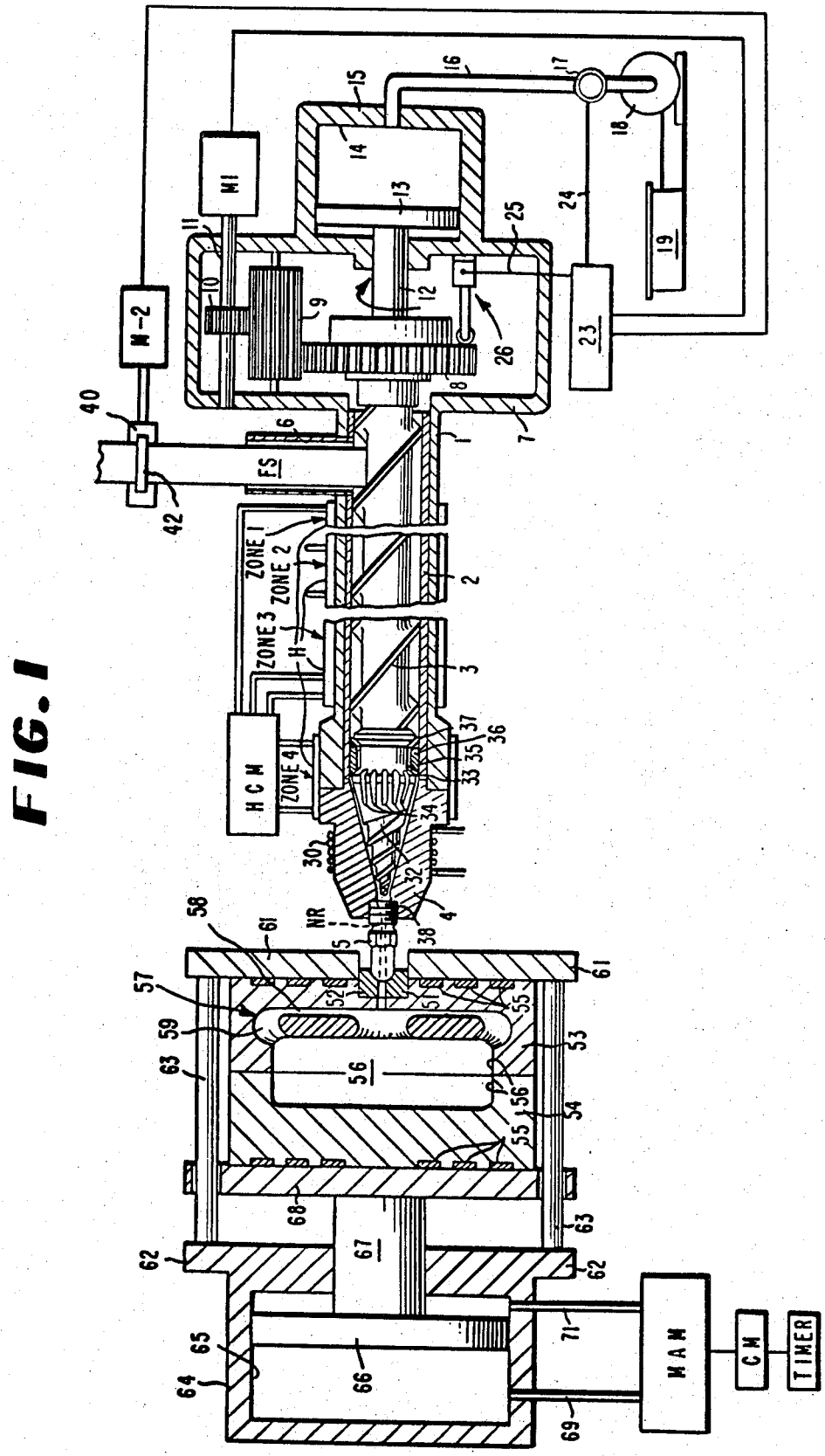
FIG. 1 is a side elevational view in partial cross section of the injection molding apparatus combination embodying features of the invention.

Referring now to the drawing, the apparatus shown comprises a supporting frame or housing structure 1 in which is supported a barrel, or cylinder, member 2. A double-flighted noncompression screw member 3 is mounted in the hollow interior portion or bore of the barrel member 2 for both reciprocation and rotation. The interior portion of barrel member 2 defines a masticating and heating zone for stock material FS supplied to the zone via feed passage 6 by an optionally knurled strip feeder roll 40 driven by motor M-2 which is connected to control means 23.

Figure 2:
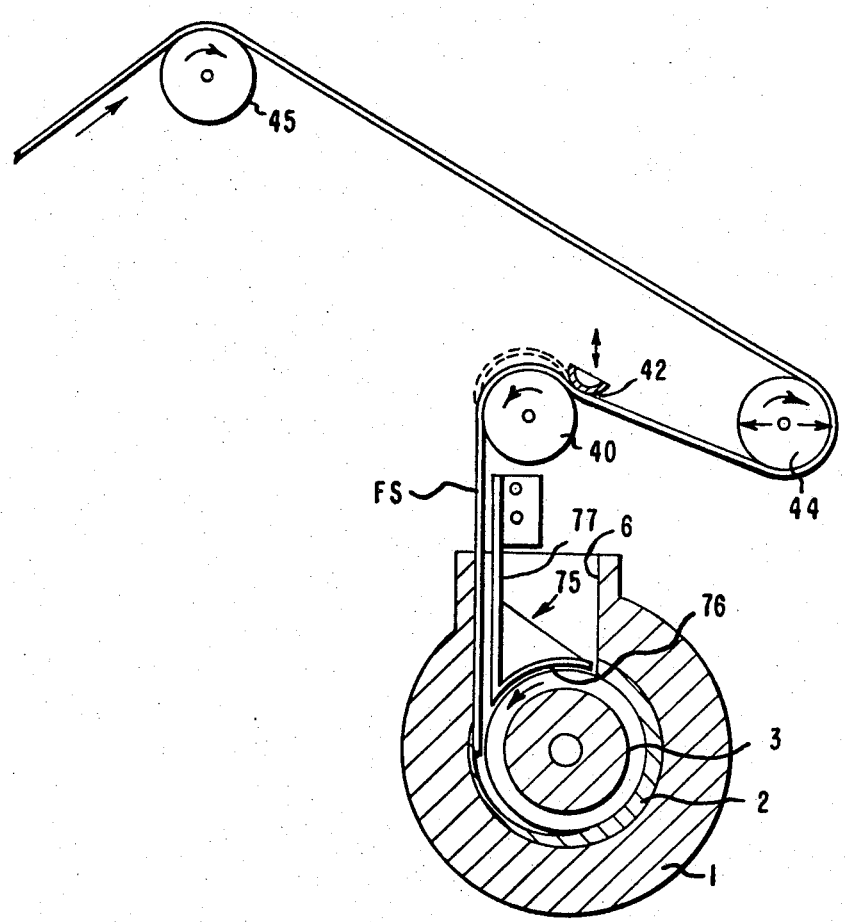
FIG. 2 is a sectioned view of FIG. 1, showing the deflecting member in position in the inlet and the arrangement of guides cooperating with the driven material feed roll.

As shown in FIG. 2, the strip feeder also includes two guide rolls 44, 45 and a ½ round baffle 42 of adjustable height. In operation, the speed of the drive roll is set so that the surface velocity of roll 40 is slightly greater than the demand by the screw and as a result, there is a slight looseness in the feed stock entering passage 6. The feed stock is a flat strand elastomeric material having a sufficient stiffness to make it self-supporting in a vertical plane. This physical characteristic of the feed material coupled with the feed mechanism provides a self-regulating supply. In other words, the feed rate of the strand material from roll 40 is self-actuating. For example, if the rate of feed from the roll is greater than the demand of the screw, the flat strand material lifts away from roll 40 and the flow rate is automatically reduced and when the demand by the screw catches up with the roll, the strand material lowers itself back onto the surface of roll 40. Baffle 42 prevents wrapping of the strand around roll 44 when the strand lifts itself from the roll 40.

Passage 6 is arranged transverse to the longitudinal axis of screw chamber 2 and is smoothly faired into the normal cross section of the chamber in the direction of screw rotation. This provides what is termed offset feed or a feed that is tangential to screw 3. Located within passage 6 is a material deflecting member generally designated 75 comprised of a lower surface 76 concentric with the screw 3 and held in position by upright support 77 attached to frame 1. Passage 6 is preferably rectangular but may be rounded at its ends if desired. Surface 76 extends along the upstream wall of passage 6 substantially its entire length but less than its width.

A closure or cylinder head member 4 is secured to one end of structure 1 and cylinder member 2 by suitable means such as machine bolts (not shown) to define one end of the masticating and heating zone. Member 4 is provided with a passageway or outlet therethrough as shown which communicates with a passageway NR in a nozzle member 5 which is maintained in threaded engagement with a recess 38 in closure member 4. Frame member 1 is provided at its other end with an enlarged portion 7 into which one end portion 12 of the screw member 3 extends. A rotary gear element 8 is rigidly secured on the end portion 12 of screw member 3. Gear element 8 meshes with an axially elongated idler gear element 9 which is rotatably mounted in enlarged portion 7 of the frame. Gear element 9 meshes with drive gear 10 on drive shaft 11 which also is suitably mounted for rotation in enlarged portion 7 of the housing or frame structure 1. Drive shaft 11 is driven by a suitable drive means such as motor M-1 connected to control means 23 as shown.

End portion 12 of screw member 3 is provided with a piston element 13 which is slidably received in a cylinder chamber 14 in portion 15 of enlarged housing portion 7. Cylinder chamber 14 is filled with a hydraulic fluid and connected to a suitable source of pressurized fluid such as pump 18 by conduit 16 and control valve 17 which is operated by control unit 23 via conductor 24. Application of pressurized fluid to chamber 14 moves screw member to the left to the position shown in FIG. 1.

The other end of screw member 3 is provided with a tapered end portion having a screw flight 32 formed thereon. Adjacent the tapered end portion is a first enlarged circumferentially extending portion 33 and a second enlarged circumferentially extending portion 37 between which is a portion 35 of reduced diameter. There is a predetermined clearance between the exterior of enlarged portion 37 and the interior of barrel member 2. Enlarged portion 33 is provided with circumferentially spaced longitudinally extending slots or channels 34 as shown in FIG. 1. A sleeve-like valve member 36 is positioned in portion 35 of the reduced diameter with an external diameter closely fitting the interior of barrel member 2 and due to its short longitudinal dimension able to move longitudinally between one position in engagement with enlarged portion 33 and another position in engagement with enlarged portion 37.

Barrel member 2 and structure 1 are provided with means for controlling the temperature of the masticating and heating zone. This means comprises a plurality of heating jackets H longitudinally spaced in four zones along the barrel member from the feed passage 6 to cylinder head member 4 to maintain the desired temperature condition. Heated fluid is circulated through the heating jackets H under control of heating control means HCM. An additional heat control conduit 30 is provided on cylinder head member 4 for heating or cooling thereof as desired.

A mold cavity 56 is defined by cooperating structures of a fixed mold member 53 and a movable mold member 54. Mold member 53 is rigidly secured by suitable conventional means (not shown) to a fixed platen member 61 and is provided with passages 57 connecting the mold cavity to a passageway in a sprue bushing member 52 which is removably mounted in a recess in this mold member as shown. Passages 57 are comprised of first sections 58, and second sections 59. These sections are smoothly contoured and the second section 59 expands to a greater cross-sectional area than first section 58 to accommodate the thermal expansion of the material moving to the mold cavity due to frictional heat and the exothermic heat of cure. The size of section 59 is also selected such that a predetermined amount of additional frictional heat is generated.

Sprue bushing member 52 is provided with a passageway therethrough which cooperates with the nozzle member 5 and restricted passageway NR to maintain free communication through the bushing member and nozzle member to the interior of the barrel member 2.

Rigid platen member 61 is rigidly connected to stationary structural member 62 by a plurality of rod or tie bar elements 63. The movable mold member 54 is rigidly secured by suitable conventional means (not shown) to a movable platen member 68 which is provided at its other end with a piston member 66 which is mounted for reciprocating movement in a chamber 65 filled with a hydraulic fluid. Chamber 65 is connected by suitable conduits 69 and 71 to a suitable source of pressurized fluid MAM, such as a pump controlled by a control means CM and a timer means as shown. Movable platen member 68 is provided with bearing portions through which the tie bar elements 63 extend in order to act as guides for the movement of the movable mold and its platen.

Passageways 55 are provided in both fixed and movable mold members for the circulation therethrough of a heat transfer medium for control of the temperature of the mold cavity and members.

A device 26 for sensing the movement of screw 3 is connected between gear 8 and the enlarged portion of the frame 7 and generates a signal proportional to the rearward movement of gear 8. The signal is fed to control unit 23 via cable 25. Control unit 23 is in turn coupled to valve 17, and motors M-1, M-2 for regulation thereof.

In operation, the screw member 3 is rotated in the direction shown by the arrow in FIG. 1 by operation of motor M-1 at a predetermined speed to masticate and heat feed stock material supplied into feed passage 6. The material being masticated and heated is moved by the screw flights of the screw member toward the left end of the cylinder member as viewed in FIG. 1, passing between the outer periphery of enlarged portion 37 in the screw and the inner surface of the barrel member 2 through radially reduced portion 35 of the screw member, forcing valve element 36 to its left-most position against enlarged portion 33 of the screw member, and moves through channels 34 into the space between the tapered ends 32 of the screw member and the closure member 4. As this material moves into this space, the screw member is gradually moved to the right with gear 8 sliding axially along elongated idler gear 9, until the desired amount of material has been accumulated. The pressure developed in the material by the screw rotation is high enough to slide the screw member 3 to the right and force fluid out of chamber 14 through valve unit 17, pump means 18 which is not operating and back to reservoir 19. However, this pressure and the viscosity of the material being masticated and heated is not sufficient to cause the material to move through the restricted passageway NR in nozzle member 5. If the viscosity were such that leakage occurred, a nozzle shutoff in the form of a sliding gate valve could be employed to prevent this. Movement of screw member 3 to the right moves the plunger of sensing device 24, this in turn, results in a signal being sent to control unit 23 which then increases the speed of motor M-1. The rotation of the screw and operation of the barrel heating control means HCM with jackets H are established to elevate and maintain within close tolerances within a predetermined first time period. The temperature of the masticated material being accumulated in the barrel is maintained at an elevated level to reduce viscosity of the material to substantially the lowest level possible without scorching or precuring of the material in this heating and masticating zone.

When the desired amount of this heated material has been accumulated in the barrel member 2 between the tapered portion 32 of the screw member 3 and the nozzle member 5 as sensed by device 24, the mold member being in closed positon, operation of motor M-1 and rotation of the screw member is stopped. The operation of motor M-2 and roll 40 is stopped at the same time and pump means 18 and valve unit 17 are energized to supply pressurized fluid tank 19 rapidly to chamber 14. The pressurized fluid in chamber 14 forces piston 13 to the left carrying with it screw member 3. This movement of the screw member 3 causes the valve element 36 to move to the right engaging enlarged portion 37 to prevent movement of the masticated material to the right along the screw member, and in addition causes substantially all of the accumulated heated material to flow through the restricted passageway NR in nozzle, the passageway in bushing member 52, the mold runner passages 57 into the mold cavity very rapidly. The pressure of the fluid supplied to chamber 14 is sufficiently high and screw member movement is sufficiently rapid relative to the length and dimensions of the passageway connecting the interior of the barrel member and the mold cavity that the material being moved through the passageway becomes internally heated due to friction to a very high temperature at which very rapid curing occurs by the time it moves into the mold cavity. This pressure and character of the passageway must also cooperate to insure that the mold cavity is filled within a predetermined second time period before substantially any curing occurs.

Before entry of the material into the molding cavity, the mold temperature is maintained at a temperature closely matched with that of the incoming material which is at a very rapid curing temperature. The mold and material contained therein are maintained at this elevated temperature to cause very rapid uniform curing throughout the material sufficient to permit removal thereof from the mold cavity without significant damage within a predetermined short third time period. The mold is opened by supplying pressurized fluid to the right side of portion 66 from mold actuating pump means MAM and releasing pressure on the left side of piston member 66. The molded material is removed for further processing, which usually involves an additional curing step in a suitable heated curing oven until the final cure conditions are achieved. The mold is closed by releasing pressure in conduit 71 and supplying high pressure fluid through conduit 69 to the left side of piston 66.

The pressure on the right side of piston 13 is released a sufficient interval after filling of the mold cavity to permit material in the nozzle passageway and bushing member 52 passageway to immobilize. A predetermined time period or delay after this release of pressure, screw rotation and accumulation of heated material for the next mold filling operation begins. This delay is selected such that by the time the material completes its cure in the mold cavity, the mold is opened, the molded article removed, and the mold is closed, the screw member will have masticated, heated and accumulated the next amount of material for the next mold filling operation so that filling of the mold cavity can commence without delay which could cause precuring or scorching in the barrel member. Control of this time delay is achieved by means of a suitable timer means action initiated by any suitable event having the desired time relation to the release of pressure on the material in the mold cavity and passageways connected therewith.

The surface 75 may have several configurations, however, particularly good results have been obtained by the configuration shown in FIG. 2 which is cylindrical in shape and concentric with screw 3 and separated from the screw by a small distance. This configuration is particularly effective because it spreads any buildup which initiates over the surface of the screw thus essentially eliminating the balling problem.

The elastomeric feed material has been illustrated as one flat strand, however it may be subdivided into smaller strips and when this is done the vertical face of support 77 facing the strand is modified to contain a number of vertically oriented parallel ridges to guide each of the strips into the screw.

What is claimed is:

1. In a reciprocating screw injection molding apparatus that includes a reciprocable rotatable driven screw and an elongated housing surrounding the screw, said housing having an outlet adjacent one end and an inlet adjacent the other end of the screw, and wherein an elastomeric material is first fed through said inlet according to the demand of the screw, a feed mechanism for a flat strand material comprising: said inlet defining a feed passage transverse to the longitudinal axis of the housing, said passage being smoothly faired into the normal cross section of said housing in the direction of screw rotation; a material deflection member extending into said feed passage substantially the entire length thereof and less than the width thereof, said member engaging the upstream wall of said passage; a roll driven by a motor located directly above said inlet and engaging said flat strand to feed said strand into said inlet in a vertical path at a fixed velocity, said motor being coupled to a control means which actuates the motor in response to the screw rotation, and said strand having sufficient stiffness to lift itself from said roll when the demand is less than the feed velocity and to lower itself onto the roll when the demand catches up with the feed velocity.

2. The apparatus defined in claim 1, including a baffle located adjacent the upper portion of said roll, said strand material passing between said baffle and said roll, said baffle maintaining the strand material lifted from the roll in close proximity to said roll.

3. The apparatus as defined in claim 1, said roll having a knurled surface.

4. In apparatus for controlling the input of material to a plasticator of the type in which a rotating screw disposed within the bore of a barrel works the material into a flowable state as the material is advanced longitudinally along the screw, the improvement comprising a barrel inlet communicating with the barrel bore and having a restricted passage for admitting endwise to the bore a flexible strip of the material to be plasticated, a driven feed roll spaced from and in line with said barrel inlet, and guide means over which the strip may be directed to that side of the driven feed roll opposite said barrel inlet so that the strip may contact the feed roll surface to be advanced thereby as long as material input to the screw is required but may automatically loop away from the feed roll surface when the material input requirements of the screw are satisfied.

5. Apparatus according to claim 4 wherein the entrance to said barrel inlet faces upwardly and said feed roll is directly above and close to said entrance to said barrel inlet.

6. Apparatus according to claim 5 wherein said guide means includes an element located below and to one side of the top surface of said driven feed roll to cause the strip of material being fed to pass across a substantial arc at the upper surface of said driven feed roll.

7. In apparatus for controlling the input of material to a plasticator of the type in which a rotating screw disposed within the bore of an elongated barrel works the material into a flowable state as the material is advanced longitudinally along the screw, the improvement comprising a barrel inlet communicating with the barrel bore and having a restricted passage for admitting endwise to the bore a flexible strip of the material to be plasticated, a feed roll spaced from and in line with said barrel inlet and having an axis generally parallel to the length of said barrel, means for driving said feed roll at a rate such that its surface speed is at least as great as the maximum requirement of the screw for linear increments of strip material to be plasticated, and guide means over which the strand or strip may be directed to that side of the driven feed roll opposite said barrel inlet so that the strip may contact the feed roll surface to be advanced thereby as long as material input to the screw is required but may automatically form a loop portion spaced from the feed roll surface when the material input requirements of the screw are satisfied.

* * * * *